(12) United States Patent  (10) Patent No.: US 7,797,633 B2
Flick et al.  (45) Date of Patent: Sep. 14, 2010

(54) STREAMING TO MEDIA DEVICE DURING ACQUISITION WITH RANDOM ACCESS (75) Inventors: Christopher Lance Flick, San Jose, CA (US); David L. Biderman, San Jose, CA (US); Rainer Brodersen, San Jose, CA (US); Jeffrey Robbin, Los Altos, CA (US); Eric Taylor Seymour, San Jose, CA (US); Thomas Michael Madden, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 521 days.

(21) Appl. No.: 11/621,086

(22) Filed: Jan. 8, 2007

(65) Prior Publication Data

US 2008/0168359 A1  Jul. 10, 2008

(51) Int. Cl.
G06F 15/16 (2006.01)
(52) U.S. Cl. ........................................ 715/726; 715/720
(58) Field of Classification Search ......... 715/748–749, 715/760, 721–726, 720, 859; 709/206, 230
See application file for complete search history.

(56) References Cited

U.S. PATENT DOCUMENTS

| 6,807,367 | B1 * | 10/2004 | Durlach ...................... 386/125 |
| 2002/0091782 | A1 * | 7/2002 | Benninghoff, III .......... 709/206 |
| 2002/0093923 | A1 | 7/2002 | Bouet |
| 2003/0074379 | A1 * | 4/2003 | Keohane et al. ............. 707/205 |
| 2003/0099364 | A1 | 5/2003 | Thompson et al. |
| 2004/0078453 | A1 * | 4/2004 | Bhogal et al. ............... 709/219 |
| 2004/0139238 | A1 * | 7/2004 | Luhrs ........................... 710/1 |
| 2005/0102371 | A1 * | 5/2005 | Aksu ............................ 709/217 |
| 2005/0215238 | A1 * | 9/2005 | Macaluso ................. 455/414.1 |
| 2006/0013555 | A1 * | 1/2006 | Poslinski .................... 386/46 |
| 2006/0013557 | A1 * | 1/2006 | Poslinski .................... 386/46 |
| 2006/0133340 | A1 * | 6/2006 | Rybak et al. ................ 370/338 |
| 2007/0061759 | A1 * | 3/2007 | Klein, Jr. .................... 715/853 |
| 2007/0067305 | A1 * | 3/2007 | Ives ............................. 707/10 |
| 2007/0157112 | A1 * | 7/2007 | Peters ......................... 715/786 |
| 2007/0294622 | A1 * | 12/2007 | Sterner et al. ............... 715/716 |

(Continued)

FOREIGN PATENT DOCUMENTS

WO  WO2006-016282  2/2006

OTHER PUBLICATIONS http://www.youtube.com, 2006.*

*Primary Examiner*—Steven P Sax
(74) *Attorney, Agent, or Firm*—Fish & Richardson P.C.

(57) ABSTRACT

Playing a media file can include receiving input from a user identifying a playback location associated with a media file; downloading media content corresponding to the identified playback location from the media file; displaying a status bar to the user on a display device; and presenting a download indicator associated with the status bar showing an amount of downloaded media content, wherein the downloaded media content comprises a contiguous portion of the media file that includes the identified playback location. Further, playing the media file can include receiving additional input from a user identifying a new playback location associated with a media file; downloading media content corresponding to the new playback location; and presenting a new download indicator associated with the status bar showing an amount of downloaded media content, wherein the downloaded media content comprises a contiguous portion of the media file that includes the new playback location.

27 Claims, 8 Drawing Sheets

U.S. PATENT DOCUMENTS

2008/0168516 A1* 7/2008 Flick et al. .................. 725/112
2009/0138808 A1* 5/2009 Moromisato et al. ........ 715/758
2009/0144382 A1* 6/2009 Benninghoff, III .......... 709/206

* cited by examiner

STREAMING TO MEDIA DEVICE DURING ACQUISITION WITH RANDOM ACCESS

The present disclosure relates to media processing devices, and to systems and methods for streaming media content to a media processing device and for performing random access during streaming.

BACKGROUND

Media processing devices can be configured to play back media files that contain audio and/or video content. Early implementations required a user to download an entire media file before playback could be initiated. The amount of time required to begin playback depended on the size of the media file and the speed at which the media file could be transferred. More recently, a remote media file that is to be played back can be progressively downloaded from a remote storage device. During progressive downloading, the portion of a media file downloaded to a local media processing device can be played while one or more remaining portions of the media file are being downloaded. For example, the website www.apple.com/trailers hosts movie trailers, the contents of which can be progressively downloaded to a local media processing device and viewed using the QuickTime media player distributed by Apple Computer, Cupertino, Calif. Nonetheless, through progressive downloading, the media file is downloaded sequentially. Alternatively, media can be streamed over a streaming media server and played back on a local media processing device. Streaming media over a network, however, requires the support of a streaming protocol.

Figure 1A:
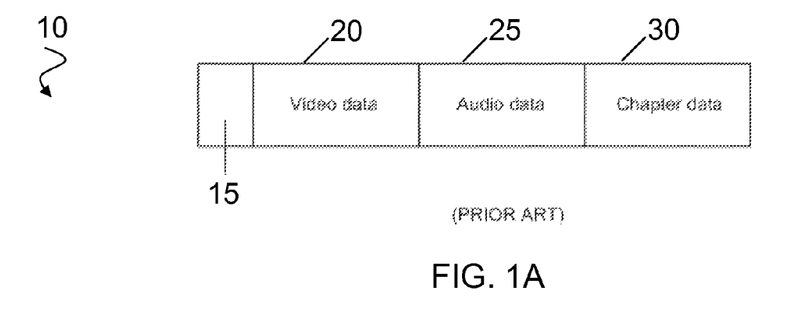
FIGS. 1A-1C present examples of a media file architecture.

FIG. 1A presents an example of the structure of a media file 10 that includes media content. The media file 10 can contain indexing information 15, video data 20, audio data 25, and chapter data 30 arranged in the sequence shown in FIG. 1A. Further, the indexing information 15 can include metadata related to the video data 20, the audio data 25, and the chapter data 30 that is required to play back the media file 10. A media processing device can pull the media file 10 over a network from a remote media server. Alternatively, the remote media server can push the media file 10 over the network to the media processing device.

Figure 1B:
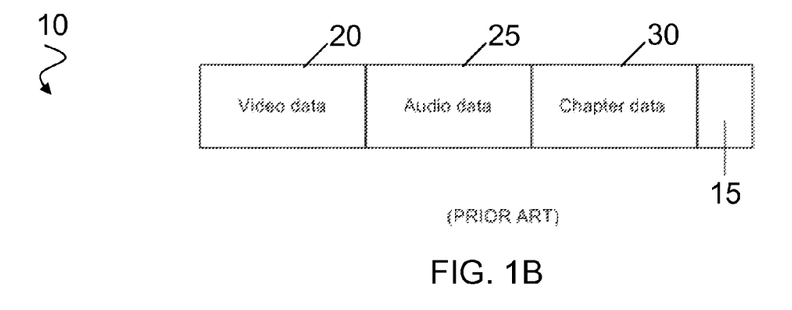
Figure 1C:
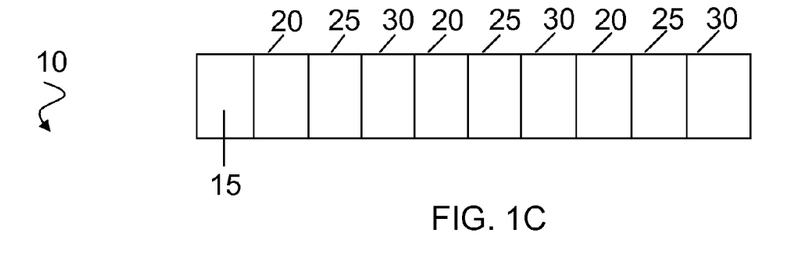

At the media processing device, the media file 10 can be saved to a storage device. During a sequential download, with respect to the file structure shown in FIG. 1A, the indexing information 15 is received first, followed by the video data 20, the audio data 25, and then the chapter data 30. Thus, it is possible that playback of a particular chapter cannot begin at the media processing device until the chapter data 30 is available, even after the corresponding audio and video data has been received. FIG. 1B presents an example of an alternative structure of the media file 10 in which the indexing information 15 is organized at the end of the media file 10. As a result, it is possible that playback of the media file 10 cannot begin until all of the indexing information 15 has been received. FIG. 1C presents an additional example of an alternative structure of the media file 10 in which the indexing information 15 can appear at the beginning of the media file 10 and the media containers representing video data 20, audio data 25, and chapter data 30 can be interleaved. Alternatively, the indexing information 15 can appear at any location in the media file 10.

Hyper Text Transfer Protocol (HTTP) provides a set of conventions that can be used to transfer or convey information within the world wide web. HTTP is a request/response protocol between clients and servers. In HTTP version 1.0, requests are issued sequentially, with the next request being issued only after the response to the current request has been completely received. HTTP version 1.1, however, allows multiple requests to be issued simultaneously without waiting to receive responses to one or more outstanding requests. The ability to issue multiple, co-pending requests is referred to as pipelining. Additionally, HTTP version 1.1 also supports requests to access specific byte ranges, which permits non-sequential retrieval from a remote server of any part of a file that can be requested as a particular range of bytes. Further, a file can include a table or map describing its organization with respect to byte addresses, such as in a header.

SUMMARY

A media processing device, such as a media client, can be configured to play back media content received over a network, such as from a remote media server. Further, the media client can be configured to perform a variety of playback functions and operations at the direction of a user, such as skipping forward, skipping backward, and randomly accessing a point in a media timeline. Many of these techniques and methods rely on configuring the media client to utilize a particular communication protocol and to structure requests for media content in accordance with user commands. In order to permit more flexible playback of media content and to reduce the delay associated with accessing different portions of media content, the present inventors recognized that it was beneficial to permit a media client to access and play back portions of media content non-sequentially.

The present inventors also recognized the need to reduce the delay experienced by a user in starting playback of media content, particularly from a starting point other than the beginning of a file. Further, the need to permit downloading the portions of a media file in a non-sequential order also is recognized. Additionally, the present inventors also recognized the need to permit non-sequential downloading of media content using HTTP 1.1. Accordingly, the techniques and apparatus described here implement algorithms for accessing, downloading, and playing back media content in a non-sequential manner.

In general, in one aspect, the techniques can be implemented to include receiving input from a user identifying a playback location associated with a media file; downloading media content corresponding to the identified playback location from the media file; displaying a status bar to the user on a display device; and presenting a download indicator associated with the status bar showing an amount of downloaded media content, wherein the downloaded media content comprises a contiguous portion of the media file that includes the identified playback location.

The techniques also can be implemented to include updating the download indicator as additional media content associated with the identified playback location is downloaded. Further, the techniques can be implemented to include presenting a plurality of separate download indicators associated with the status bar, wherein each of the plurality of separate download indicators corresponds to one or more non-contiguous portions of downloaded media content associated with the media file. Additionally, the techniques can be implemented to include presenting the plurality of separate download indicators as a single download indicator when all of the media content included in the media file has been downloaded.

The techniques also can be implemented to include receiving additional input from a user identifying a new playback location associated with a media file; downloading media content corresponding to the new playback location from the media file; and presenting a new download indicator associated with the status bar showing an amount of downloaded media content, wherein the downloaded media content comprises a contiguous portion of the media file that includes the new playback location. The techniques further can be implemented to include ceasing to present the download indicator associated with the status bar when the new download indicator is presented.

The techniques also can be implemented to include updating the download indicator as additional media content is downloaded. Further, the techniques can be implemented such that the user input comprises a skip from an existing playback location. Additionally, the techniques can be implemented such that the status bar is persistently displayed until all of the media content included in the media file has been downloaded. The techniques also can be implemented such that the status bar is persistently displayed for a predetermined duration after the user input has been received.

In general, in another aspect, the techniques can be implemented as a computer program product, encoded on a computer-readable medium, operable to cause data processing apparatus to perform operations comprising receiving input from a user identifying a playback location associated with a media file; downloading media content corresponding to the identified playback location from the media file; displaying a status bar to the user on a display device; and presenting a download indicator associated with the status bar showing an amount of downloaded media content, wherein the downloaded media content comprises a contiguous portion of the media file that includes the identified playback location.

The techniques also can be implemented to be further operable to cause data processing apparatus to perform operations comprising updating the download indicator as additional media content associated with the identified playback location is downloaded. The techniques further can be implemented to be further operable to cause data processing apparatus to perform operations comprising presenting a plurality of separate download indicators associated with the status bar, wherein each of the plurality of separate download indicators corresponds to one or more non-contiguous portions of downloaded media content associated with the media file. Additionally, the techniques can be implemented to be further operable to cause data processing apparatus to perform operations comprising presenting the plurality of separate download indicators as a single download indicator when all of the media content included in the media file has been downloaded.

The techniques also can be implemented to be further operable to cause data processing apparatus to perform operations comprising receiving additional input from a user identifying a new playback location associated with a media file; downloading media content corresponding to the new playback location from the media file; and presenting a new download indicator associated with the status bar showing an amount of downloaded media content, wherein the downloaded media content comprises a contiguous portion of the media file that includes the new playback location. Additionally, the techniques can be implemented to be further operable to cause data processing apparatus to perform operations comprising ceasing to present the download indicator associated with the status bar when the new download indicator is presented.

The techniques also can be implemented to be further operable to cause data processing apparatus to perform operations comprising updating the download indicator as additional media content is downloaded. Further, the techniques can be implemented such that the user input comprises a skip from an existing playback location. Additionally, the techniques can be implemented such that the status bar is persistently displayed until all of the media content included in the media file has been downloaded. The techniques also can be implemented such that the status bar is persistently displayed for a predetermined duration after user input has been received.

The techniques described in this specification can be implemented to realize one or more of the following advantages. For example, the techniques can be implemented such that any portion of a media file stored on a remote server can be accessed and downloaded to a media client using one or more requests that specify a specific byte range. The techniques also can be implemented to permit the use of a plurality of simultaneous byte-range requests. Additionally, the techniques can be implemented such that one or more byte-range requests are transmitted from the media client to the media server in response to an input received from a user. The techniques also can be implemented such that media content received by the media client can be played back before the entirety of the media content has been received. The techniques further can be implemented such that a plurality of non-sequentially downloaded portions corresponding to a single media file can be sequentially ordered.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 2:
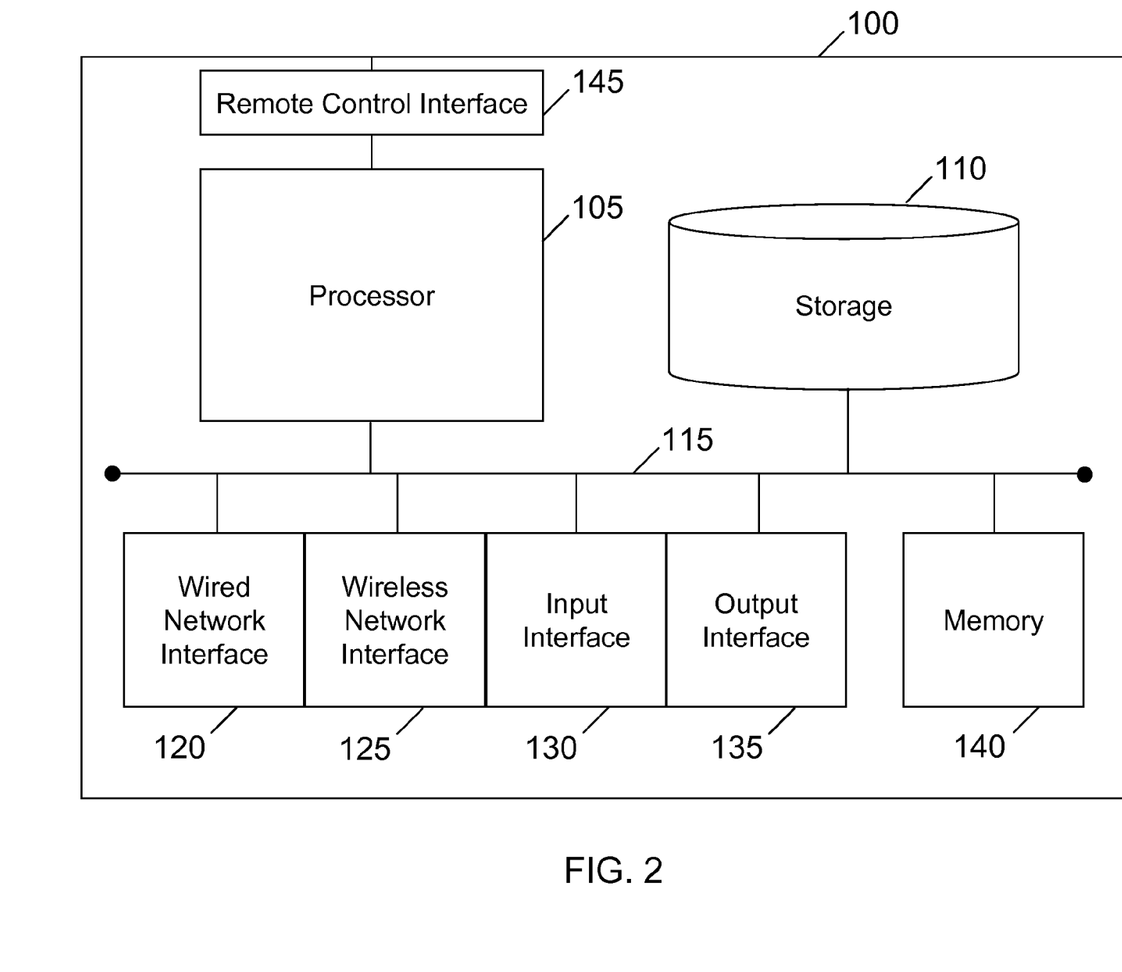
FIG. 2 is an example of a media client.

FIG. 2 presents a media client 100 that can be configured to present one or more types of media through a presentation device, including audio, video, images, or any combination thereof. The media client 100 includes a processor 105 configured to control the operation of the media client 100. For example, the processor 105 can control communications with one or more media servers to receive media for playback. A media server can be any general purpose server that provides access to media content. The media can be received through push and/or pull operations, including through downloading and streaming. The processor 105 also can be configured to generate output signals for presentation, such as one or more streams representing media content or an interface for interacting with a user.

The media client 100 also includes a storage device 110 that can be configured to store information including media, configuration data, and operating instructions. The storage device 110 can be any type of non-volatile storage, including a hard disk device or a solid-state drive. For example, media received from an external media server can be stored on the storage device 110. The received media thus can be locally accessed and processed. Further, configuration information, such as the resolution of a coupled display device or information identifying an associated media server, can be stored on the storage device 110. Additionally, the storage device 110 can include one or more sets of operating instructions that can be executed by the processor 105 to control operation of the media client 100. In an implementation, the storage device 110 further can be divided into a plurality of partitions, wherein each partition can be utilized to store one or more types of information. Additionally, each partition can have one or more access control provisions.

A communication bus 115 couples the processor 105 to the other components and interfaces included in the media client 100. The communication bus 115 can be configured to permit unidirectional and/or bidirectional communication between the components and interfaces. For example, the processor 105 can retrieve information from and transmit information to the storage device 110 over the communication bus 115. In an implementation, the communication bus 115 can be comprised of a plurality of busses, each of which couples at least one component or interface of the media client 100 with another component or interface.

The media client 100 also includes a plurality of input and output interfaces for communicating with other devices, including media servers and presentation devices. A wired network interface 120 and a wireless network interface 125 each can be configured to permit the media client 100 to transmit and receive information over a network, such as a local area network (LAN) or the Internet. Additionally, an input interface 130 can be configured to receive input from another device through a direct connection, such as a USB or an IEEE 1394 connection.

Further, an output interface 135 can be configured to couple the media client 100 to one or more external devices, including a television, a monitor, an audio receiver, and one or more speakers. For example, the output interface 135 can include one or more of an optical audio interface, an RCA connector interface, a component video interface, and a High-Definition Multimedia Interface (HDMI). The output interface 135 also can be configured to provide one signal, such as an audio stream, to a first device and another signal, such as a video stream, to a second device. Further, a non-volatile memory 140, such as a read-only memory (ROM) also can be included in the media client 100. The non-volatile memory 140 can be used to store configuration data, additional instructions, such as one or more operating instructions, and values, such as one or more flags and counters. In an implementation, a random access memory (RAM) also can be included in the media client 100. The RAM can be used to store media content received in the media client 100, such as during playback. Further, media content can be stored in the RAM whether or not the media content is stored on the storage device 110.

Additionally, the media client 100 can include a remote control interface 145 that can be configured to receive commands from one or more remote control devices (not pictured). The remote control interface 145 can receive the commands through wireless signals, such as infrared and radio frequency signals. The received commands can be utilized, such as by the processor 105, to control media playback or to configure the media client 100. In an implementation, the media client 100 can be configured to receive commands from a user through a touch screen interface. The media client 100 also can be configured to receive commands through one or more other input devices, including a keyboard, a keypad, a touch pad, a voice command system, and a mouse.

Figure 3:
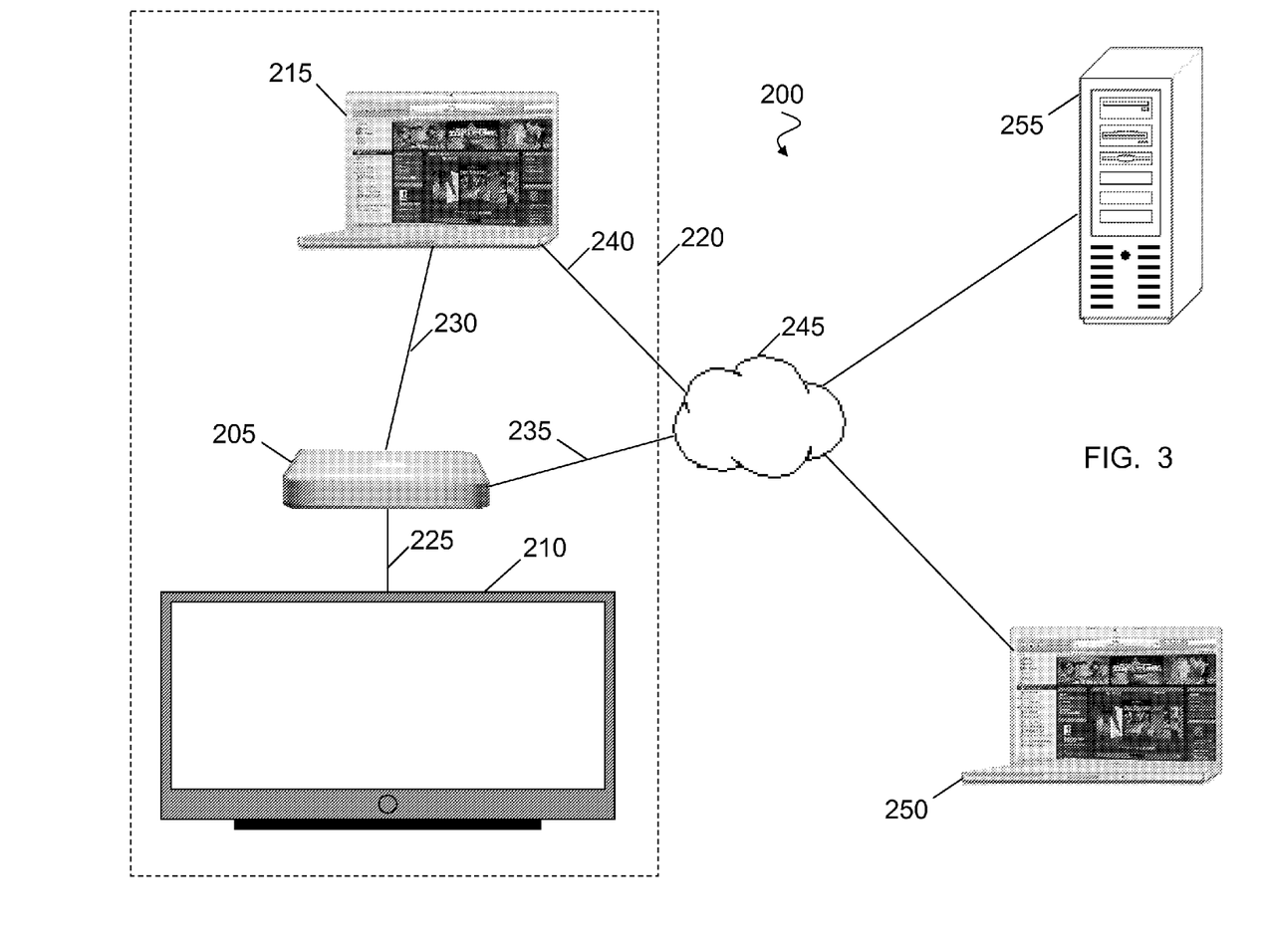
FIG. 3 is an example of a media system including a media client.

FIG. 3 presents a media system 200 that includes a media client 100. The media system 200 includes a host location 220, such as a home or office, in which the media client 100 is installed. The host location 220 also can include a local media server 215 and a presentation device, such as a monitor 210. The monitor 210 can be coupled to the media client 100 through a media connector 225, such that video and/or audio information output by the media client 100 can be presented through the monitor 210. Further, the media client 100 can be coupled to the local media server 215 through a local connection 230, such as a wired network connection, a wireless network connection, or a direct connection. As such, the media client 100 can receive media content from the local media server 215. The local media server 215 can be any computing device, including a personal computer, a server, a palm top computer, or a media device capable of storing and/or playing back media content.

Further, the media client 100 and the local media server 215 can include network connections 235 and 240 respectively, which provide access to a network 245, such as the Internet. In an implementation, the media client 100 can communicate with a remote media server 250 and/or a media store 255 over the network 245. For example, a connection can be established between the media client 100 and the remote media server 250. The connection can be secure or unsecure. Thereafter, the media client 100 can receive media content from the remote media server 250, such as by streaming or downloading.

Similarly, the media client 100 can be configured to receive media content from a media store 255. For example, upon establishing a connection, the media client 100 can request a list of available media content from the media store 255. The list of available media content can include free content, such as trailers and pod casts, and for-purchase content, such as movies, television programs, and music. Additionally, the media client 100 can be configured to communicate with the media store 255 to validate media content, such as by verifying digital rights management information.

Media content can be transferred from any remote server, such as the remote media server 250 or the media store 255, via one or more transmission protocols, including Hyper Text Transfer Protocol (HTTP). For example, the media client 100 can request media content from a remote media server 250. In response, the remote media server 250 can transmit the requested media content to the media client 100 using HTTP. The media content can be transferred using a plurality of data packets, which are separately transmitted over the network 245. Further, by utilizing HTTP version 1.1, the media client 100 can transmit a plurality of requests for media content to the media server. The plurality of requests can be transmitted simultaneously or close in time, such that a request for media content is not delayed until a response to a previous request is received. As a result, latency in the transfer of requested media content can be reduced. Additionally, by utilizing HTTP version 1.1, one or more byte ranges can be identified to request specific portions of media content.

Figure 4A:
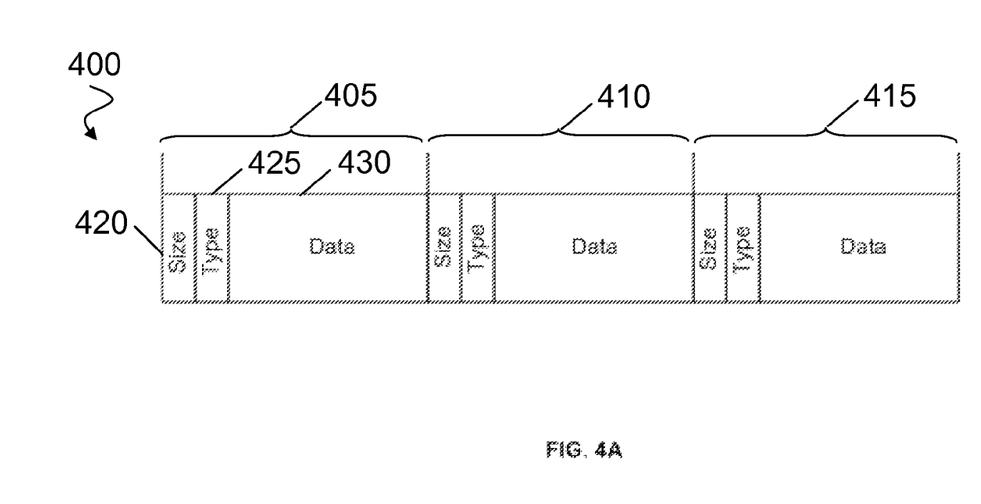
FIG. 4A is an example of an alternative media file architecture.

FIG. 4A presents an example of the structure of a media file 400. In an implementation, a QuickTime (.mov) file can be encoded in the format shown in FIG. 4A. Further, the media file 400 can be played back on a media player, such as a media client 100 or a computer executing a media client application.

The media file 400 can include a plurality of atoms, including the atoms 405, 410, and 415. Further, the plurality of atoms can be sequentially ordered in the media file 400. Each atom, such as the atom 405, can include a size field 420, a type field 425, and a data portion 430. The length of an individual atom can vary depending on its contents. In another implementation, the media file 400 can include a plurality of structures comprising key, length, and value elements. Alternatively, the data portion of the media file 400 can be unstructured.

The size field 420 of an atom can be m bytes long, where m is an integer. In an implementation, the size field 420 can be 4 or 8 bytes long. The size field 420 can specify the total number of bytes comprising the atom. The type field 425 of an atom can be n bytes long and can include a code. In an implementation, the type field 425 can specify an ASCII code comprising one or more ASCII characters. For example, the type field 425 can be 4 bytes long and the ASCII code can be MOOV. The data field 430 represents the data portion of the atom. For example the data field 430 can contain one or more types of media content, including video, audio, images, text, or any combination thereof.

The media client 100 can be configured to access the size field 420 of an atom, such as the atom 405. Further, based on the size field 405 of the atom, the media client 100 can compute the beginning of the next atom contained in the media file 400, such as the atom 410. The media client 100 can repeat this process to sequentially access one or more additional atoms, such as the atom 415. In this manner, the media processing device 100 can traverse the media file 400 on an atom-by-atom basis.

Figure 4B:
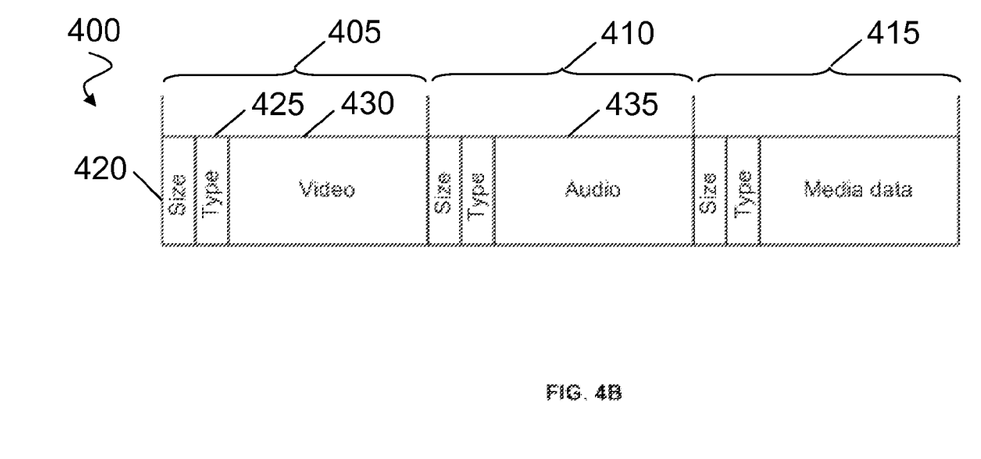
FIG. 4B is an example of a media file including a plurality of atoms.

In an implementation, one or more atoms included in the media file 400 can correspond to a type of media content, as depicted in FIG. 4B. For example, the data portion 430 of the first atom 405 can correspond to video content and the data portion 435 of the second atom 410 can correspond to audio content. In this manner, corresponding portions of the audio and video content of a media file can be grouped. Further, one or more atoms can contain media data, such as data associated with a sample table. A sample table can be used to provide a comprehensive description of the media file 400. For example, a sample table can include descriptions of the contents of each atom included in the media file 400, which further can include information describing the order and relationship of individual portions of audio and video content to the media file 400 as a whole. By accessing the sample table associated with the media file 400, the media client 100 can identify the content of each atom, including the size field 420 and the type field 425 of the atom. In an implementation, the media client 100 also can be configured to look up the sample table that describes the media file 400 when the media file 400 is accessed.

The media client 100 can employ the byte range request feature of HTTP version 1.1 to first obtain the media data, such as a sample table, included in a media file 400. Although a media file 400 is frequently ordered such that the media data appears at the beginning of the file, the media data can be located at any position in the file. For example, if the media data is located in bytes 30-39 of the media file 400, the media client 100 can issue one or more byte-range requests from the media server for bytes 30-39. Further, bytes 30-39 can be requested before requests for bytes 1-29 are issued. Additionally, the pipelining feature of HTTP version 1.1 can permit the media client 100 to request a plurality of data items simultaneously, without having to issue individual, consecutive requests. For example, the media client 100 can transmit temporally overlapping byte-range requests for data stored in different portions of the media file 400.

Additionally, HTTP version 1.1 can be used to access a media file that is larger than the available storage and/or memory included in the media client 100. For example, a media file with a file size of 2.0 GB can be played back even though only 100 MB of storage are available in the media client 100. The media client 100 can be configured to maintain in storage a high percentage of data associated with forward playback of the media file. Once all of the available storage, e.g. 100 MB, has been filled, the media client 100 can evict data associated with played portions of the media file at the same rate additional portions of the media file are downloaded. If the user performs an operation terminating forward playback, such as reverse seek, the portions of the media file required to complete the operation can be downloaded.

Once the media data describing the media file 400 has been retrieved, the media processing device 100 can initiate playback of the media file 400. In an implementation, the media client 100 can buffer a predetermined amount of the media content, including audio content and video content, before beginning playback. The predetermined amount of media content can represent a fixed amount of playback time at a standard playback rate or can be a proportional amount based on an average download rate, such as an amount that is projected to allow uninterrupted playback of all or a portion of the media file. Further, one or more parameters, such as the average download rate, can be periodically updated during playback. The media client 100 can be configured to begin playback in a default state, such as from the beginning of the media file, unless otherwise instructed by a user. Further, the media client 100 can commence progressive download of the media file 400 from the beginning of the file. In an implementation, the media client 100 also can be configured not to download information, such as the media data, that already has been downloaded to and/or stored on the media client 100.

Figure 5A:
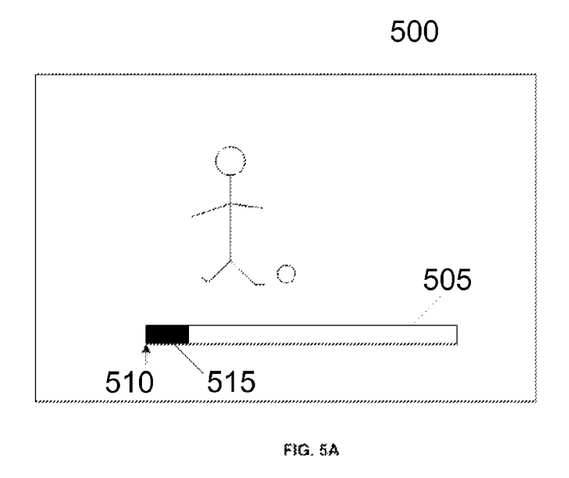
FIGS. 5A-5B present a status bar indicating progressive download from a media source.

FIG. 5A presents an example of a status bar displayed on a display device 500 to indicate the state of a progressive download. In an implementation, a user interface indicating playback of the media file 400 can be presented on a display device 500, including a television monitor, an integrated display, a computer monitor, or such device. In a default playback state, the device controlling playback, such as the media client 100, can identify the media data included in the media file 400 and commence progressive download from the first atom. Playback can be initiated after a predetermined amount of the media file 400 has been downloaded (or buffered). Additionally, the media client 100 can be configured to display a status bar 505 on the display device 500 to indicate that content is being downloaded and to provide an indication of the current status of the download. For example, as content is downloaded, the status bar 505 can be progressively filled with a download indicator 515, such as with a color or pattern, beginning from the start location 510. The default start location can be the beginning of the media file 400, which corresponds to the beginning of the status bar 505. Alternatively, the start location 510 can correspond to the position at which the current playback operation was initiated, either by the media client 100 or in accordance with input received from a user. For example, the media client 100 can be configured to resume playback of a media file based on a previously stored indicator.

The media client 100 can receive an input from a user, such as through a remote control or touch screen interface, requesting playback of the media file 400 at a location removed from the current playhead position, such that playback does not proceed sequentially. The location in the media file can represent a time with respect to the media file. Alternatively, the location can represent an offset of data within the media file.

Figure 5B:
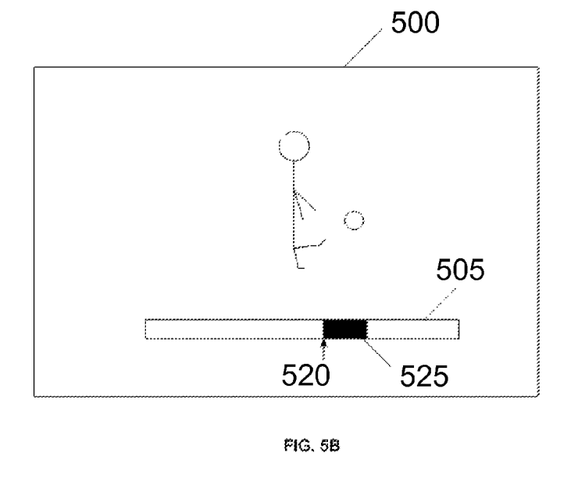

For example, indexing information can map media time to corresponding file offsets. In an implementation, the input can specify any playback position within the media file 400. Alternatively, the requested playback position can be specified relative to the current playback position, such as a specific increment forward or backward in the media file 400 For example, a remote control device can include a plurality of buttons, wherein each button can be configured to perform one or more functions. A command associated with one or more buttons can cause the media client 100 to skip (or "jump") from the current playback position to a new playback location in the media file 400. When the skip occurs, a new start location 520 is identified corresponding to the beginning of the new playback location, as is shown in FIG. 5B.

In an implementation, the new start location 520 can be a function of the duration of the media file 400, which can be expressed in the media data associated with the media file 400. For example, the media client 100 can logically divide the media file 400 into a plurality of segments for playback. Further, the segments can be designated such that all of the segments have substantially the same duration. Upon sensing the input signal to commence playback at a new location, the media client 100 can be configured to skip forward or backward from the current playback location by a predetermined amount. The new playback location can then be used to identify the new start location 520. As content is downloaded from the new start location 520, the status bar 505 can be progressively filled with a download indicator 525, such as with a color or pattern. When sufficient data has been downloaded starting from the new download location 520, the media client 100 can resume playback of the media file 400.

In an implementation, the progressive download can be indicated on a display device and the download location can be selected using a pointer displayed on the display device. The pointer can be operated using a keyboard or a suitable pointing device (e.g., mouse, track ball, stylus, touch screen) to interact with the display device. The pointing device also can be operated by a near contact screen that employs a regional sensing field to detect objects in proximity with screen. In another implementation, the remote control device can be configured to include a touch screen interface. The touch screen interface of the remote control device can display the status bar 505 as it is displayed on the display device 500. The media client 100 also can be configured to display a pointer on the display device 500, the location of which can be controlled by the user through input provided to the remote control device. The pointer can be used to select a playback location. If a new playback location is selected, the media client 100 can commence downloading the corresponding portion of the media file 400.

Figure 6A:
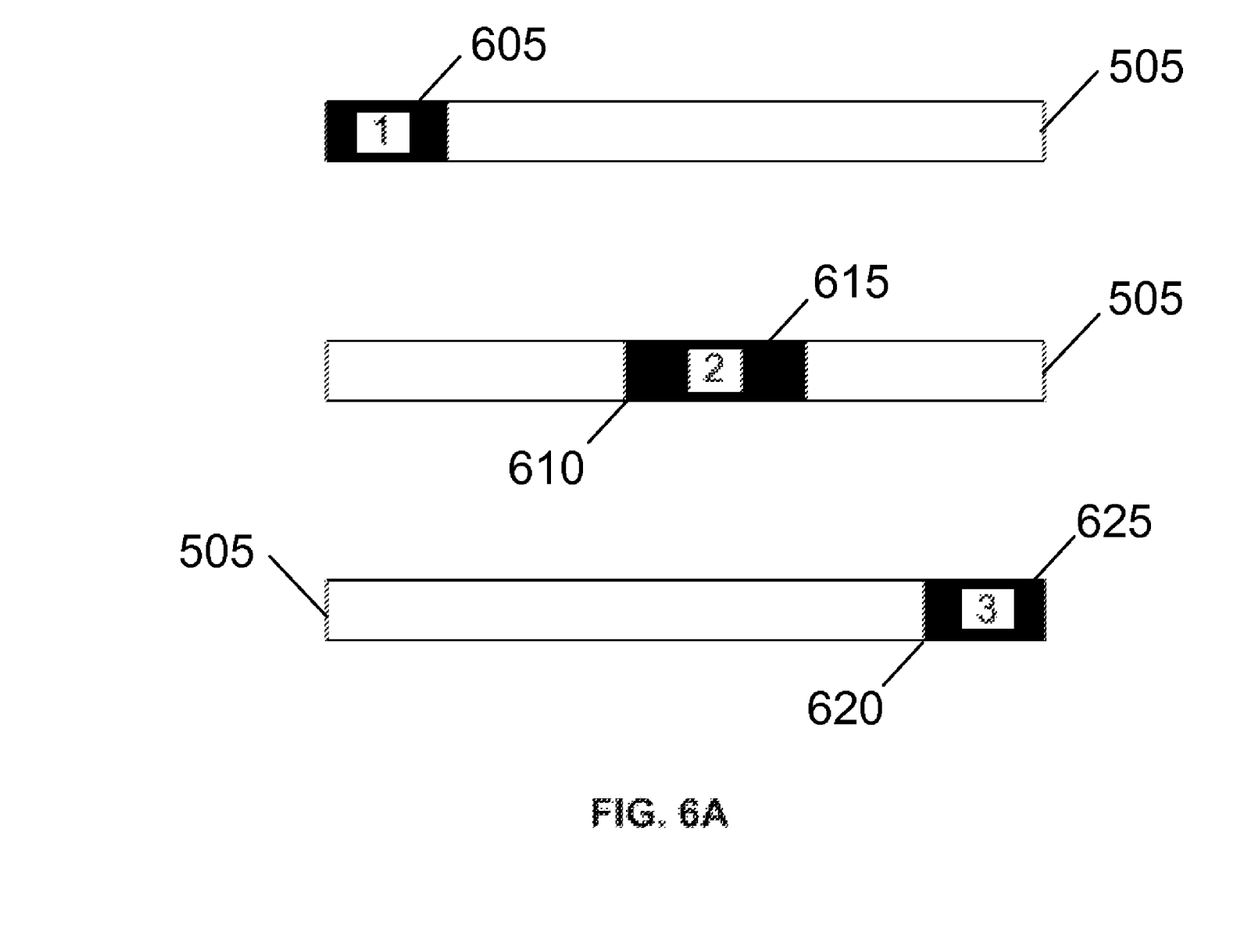
FIG. 6A is a comparison between a displayed status bar and a download status.

FIG. 6A presents an example of the display of a status bar 505 with respect to the represented download status. The status bar 505 can be displayed on the display device 500. Initially, the media client 100 can assign the start location 510 to the beginning of the media file 400 and commence downloading. As the media file 400 is downloaded, the media client 100 can progressively modify the status bar 505 to include a download indicator, such as by filling in a color or pattern, to indicate the portion of the media file 400 that has been downloaded. Thus, the status bar 505 can provide an indication to a user of the portion of the media file 400 that is available for playback.

Upon receiving input from a user to play back a different portion of the media file 400, the media client 100 can commence downloading the portion of the media file 400 associated with the requested portion. In FIG. 6A, the first filled portion 605 of the status bar 505 serves as a download indicator to represent the portion of the media file 400 downloaded at the beginning of a playback operation.

Subsequently, input received from a user can indicate that playback of a second portion of the media file 400 is desired. If the second portion of the media file 400 is not contiguous with the portion of the media file 400 represented by the first filled portion 605, content corresponding to the second portion can be downloaded. Thus, the media client 100 commences downloading the portion of the media file 400 corresponding to the second portion. As downloading of the second portion commences, the media client 100 can fill the status bar 505 from the second start location 610, generating a second filled portion 615. In an implementation, all other filled portions of the status bar 505 can be hidden and only the download indicator corresponding to the current playback location, i.e. the second filled portion 615, can be displayed. Although a different, non-contiguous portion of the media file 400 is being downloaded, the media client 100 can store the downloaded portion of the media file 400 represented by the first filled portion 605.

Additionally, input can be received from the user to indicate that playback of a third portion of the media file 400 is desired. If the third portion of the media file 400 is not contiguous with the portion of the media file 400 represented by the second filled portion 615, the media client 100 can begin downloading content corresponding to the third portion of the media file 400. As downloading of the third portion commences, the media client 100 can fill the status bar 505 from the third start location 620, generating a third filled portion 625. In an implementation, all other filled portions of the status bar 505 can be hidden and only the filled portion corresponding to the current playback location, i.e. the third filled portion 625, can be displayed. Although a different, non-contiguous portion of the media file 400 is being downloaded, the media client 100 can store the downloaded portion of the media file 400 represented by the second filled portion 615. Further, the portion of the media file 400 corresponding to the second filled portion 615 can be stored separately from the portion of the media file 400 corresponding to the first filled portion 605.

In this manner, the media client 100 can download one or more separate portions of the media file 400 based on input received from a user. The status bar 505 can be progressively updated to indicate the status of the portion of the media file 400 being downloaded. Each separate portion of the media file 400 downloaded by the media client 100 can be stored on the media client 100. Further, the relationship between the separate portions of the media file 400 and/or the relationship between a separate portion of the media file and the complete media file 400 can be maintained by the media client 100. In an implementation, the status bar 505 can persistently display each of the portions of the media file 400 that have been downloaded. For example, the first filled portion 605 and the second filled portion 615 can be reflected on the status bar 505 while the third filled portion 625 is being downloaded.

The media client 100 also can be configured to download as much of the media file 400 as possible during the time the media file 400 is being accessed by a user. For example, if downloading of the third portion of the media file 400 is completed before playback ceases and before a command is received from the user to access a different portion of the media file 400, the media client 100 can begin downloading any other portion of the media file 400 that has not yet been downloaded.

Figure 6B:
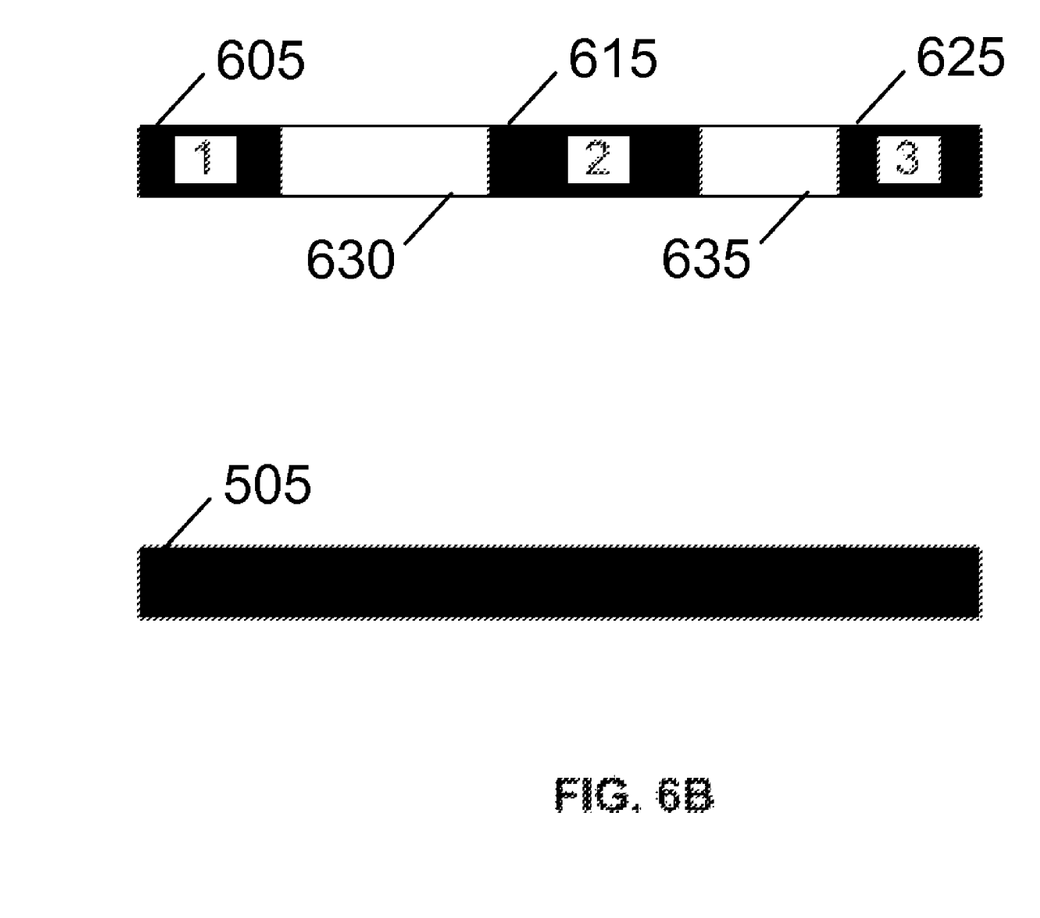
FIG. 6B is a schematic of a sequence in which portions of data are progressively downloaded.

FIG. 6B shows five portions comprising the media file 400. The first portion of the media file 400 corresponds to the first filled portion 605, the second portion corresponds to the second filled portion 615, and the third portion corresponds to the third filled portion 625. The fourth portion 630 corresponds to the media file content located between the first portion and the second portion, which has not been downloaded. Similarly, the fifth portion 635 corresponds to the media file content located between the second portion and the third portion, which also has not been downloaded. Once the third portion of the media file 400 has been downloaded, the media client 100 can download the fourth portion 630 and the fifth portion 635.

The media client 100 can be configured to select the next portion to download based on a variety of factors. For example, the media client 100 can be configured to downloading the remaining portions of the media file 400 sequentially. Alternatively, the media client 100 can be configured to prioritize the download sequence for the remaining portions of the media file 400 based on proximity to the portion of the media file 400 being played. For example, if the media client 100 is playing back the third portion of the media file 400, the fifth portion 635 could be selected for download before the fourth portion 630. In another implementation, the remaining portions can be prioritized for download based on one or more other factors, including size, the projected time remaining in the playback, and the ability to logically form a contiguous portion of the media file 400.

Further, the media processing device 100 can be configured to indicate when an additional portion of the media file 400 has been downloaded to form a logically contiguous portion. For example, once all portions have been downloaded, the status bar 505 can be filled in to reflect that the entire media file 400 has been stored locally.

In an implementation, the media client 100 also can be configured to download bi-directionally. For example, when a point in the media file 400 is selected, the media client 100 can commence sequentially downloading the content ordered after that point. Once the end of the media file 400 has been reached, the media client 100 can commence sequentially downloading the content ordered before that point, such that the media client 100 is downloading content in the direction of the beginning of the media file 400.

Figure 7:
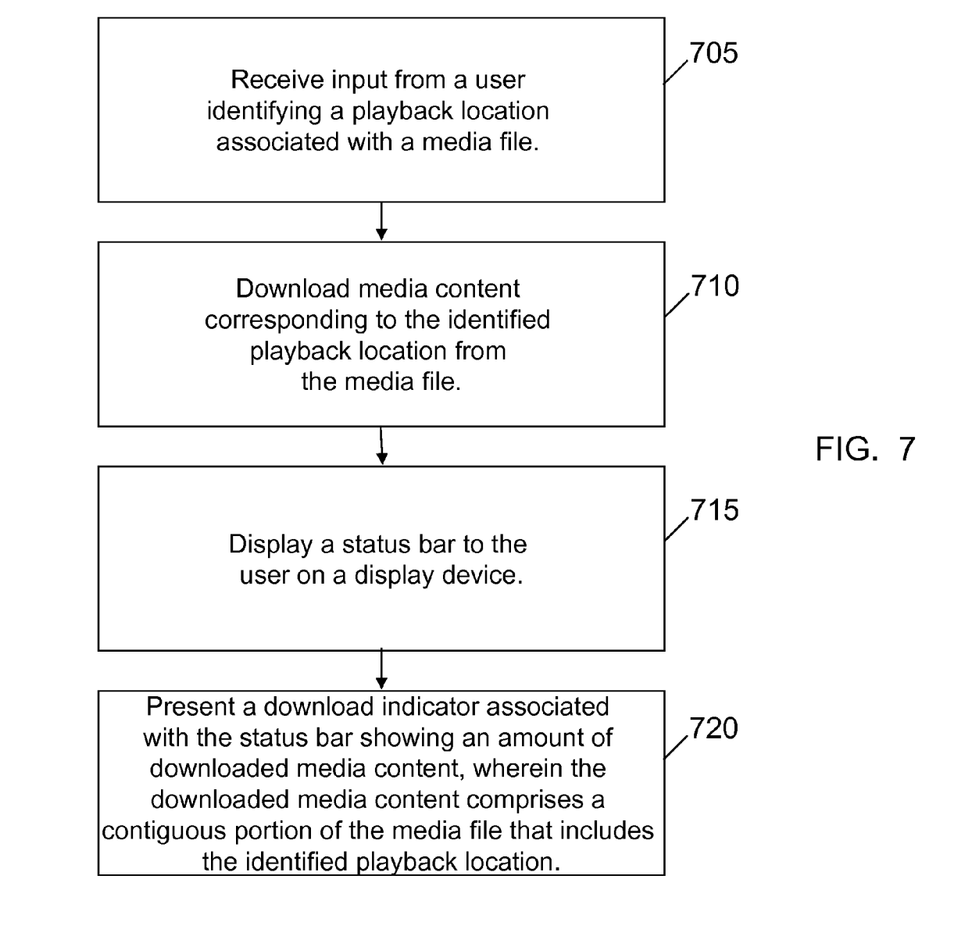
FIG. 7 presents a flowchart for a method of playing a media file.

FIG. 7 describes a computer-implemented method of playing a media file. In a first step 705, input from a user is received identifying a playback location associated with a media file. In a second step 710, media content corresponding to the identified playback location is downloaded from the media file. In a third step 715, a status bar is displayed to the user on a display device. In a fourth step 720, a download indicator associated with the status bar is presented showing an amount of downloaded media content, wherein the downloaded media content comprises a contiguous portion of the media file that includes the identified playback location.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of playing a video media file, the method comprising:
receiving input from a user identifying a playback location associated with a video media file;
downloading media content corresponding to the identified playback location from the video media file;
displaying a status bar on a display device; and
concurrently presenting a plurality of download indicators in the status bar, including a first download indicator corresponding to a first contiguous portion of the video media file that was previously downloaded and a second download indicator showing an amount of downloaded media content corresponding to a second, different, contiguous portion of the video media file that includes the identified playback location, wherein the first download indicator is not contiguous with the second download indicator,
wherein downloaded media content corresponding to the video media file is persistently stored and each portion of the downloaded media content can be accessed for playback.

2. The method of claim 1, further comprising:
updating the second download indicator as additional media content associated with the identified playback location is downloaded.

3. The method of claim 1, further comprising:
presenting the first and second download indicators as a single download indicator when all of the media content corresponding to the portion of the status bar between the first and second download indicators has been downloaded.

4. The method of claim 1, further comprising:
receiving additional input from a user identifying a new playback location associated with the video media file;
downloading media content corresponding to the new playback location from the video media file; and
presenting a new download indicator associated with the status bar showing an amount of downloaded media content, wherein the downloaded media content comprises a contiguous portion of the video media file that includes the new playback location.

5. The method of claim 4, further comprising:
updating the new download indicator as additional media content is downloaded.

6. The method of claim 1, wherein:
the user input comprises a skip from an existing playback location.

7. The method of claim 1, wherein:
the status bar is persistently displayed until all of the media content included in the video media file has been downloaded.

8. The method of claim 1, wherein:
the status bar is persistently displayed for a predetermined duration after the user input has been received.

9. A computer-readable storage medium, having encoded thereon computer-readable instructions operable to cause data processing apparatus to perform operations comprising:
receiving input from a user identifying a playback location associated with a video media file;
downloading media content corresponding to the identified playback location from the video media file;
displaying a status bar on a display device; and
concurrently presenting a plurality of download indicators in the status bar, including a first download indicator corresponding to a first contiguous portion of the video media file that was previously downloaded and a second download indicator corresponding to a second, different, contiguous portion of the video media file being downloaded that includes the identified playback location, wherein the first download indicator is not contiguous with the second download indicator,
wherein downloaded media content corresponding to the video media file is persistently stored and each portion of the downloaded media content can be accessed for playback.

10. The computer-readable storage medium of claim 9, further including instructions operable to cause data processing apparatus to perform operations comprising:

progressively updating the second download indicator as additional media content associated with the identified playback location is downloaded.

11. The computer-readable storage medium of claim 9, further including instructions operable to cause data processing apparatus to perform operations comprising:

including the first and second download indicators in a single download indicator when all of the media content included in the video media file has been downloaded.

12. The computer-readable storage medium of claim 9, further including instructions operable to cause data processing apparatus to perform operations comprising:

receiving additional input from a user identifying a new playback location associated with the video media file;

downloading media content corresponding to the new playback location from the video media file; and presenting a new download indicator associated with the status bar showing an amount of downloaded media content, wherein the downloaded media content comprises a contiguous portion of the video media file that includes the new playback location.

13. The computer-readable storage medium of claim 9, wherein:

the user input comprises a skip from an existing playback location.

14. The computer-readable storage medium of claim 9, wherein:

the status bar is persistently displayed until all of the media content included in the video media file has been downloaded.

15. The computer-readable storage medium of claim 9, wherein:

the status bar is persistently displayed for a predetermined duration after the user input has been received.

16. The method of claim 1, wherein:

the identified playback location associated with the video media file corresponds to a location other than a beginning location of the video media file.

17. The computer-readable storage medium of claim 9, wherein:

the identified playback location associated with the video media file corresponds to a location other than a beginning location of the video media file.

18. The method of claim 1, further comprising:

storing the downloaded portion of the video media file corresponding to the first download indicator separately from the downloaded media content corresponding to the second download indicator.

19. The computer-readable storage medium of claim 9, further including instructions operable to cause data processing apparatus to perform operations comprising:

storing the downloaded portion of the video media file corresponding to the first download indicator separately from the downloaded portion of the video media file corresponding to the second download indicator.

20. A system comprising:

a server storing a video media file; and a media client including processor electronics configured to perform operations comprising:

receiving input from a user identifying a playback location associated with the video media file;

downloading media content corresponding to the identified playback location from the video media file;

generating display information based on the downloaded media content, the display information including a status bar; and associating, concurrently, a plurality of download indicators with the status bar, including a first download indicator corresponding to a first contiguous portion of the video media file that was previously downloaded and a second download indicator corresponding to a second, different, contiguous portion of the video media file being downloaded that includes the identified playback location, wherein the first download indicator is not contiguous with the second download indicator, wherein downloaded media content corresponding to the video media file is persistently stored and each portion of the downloaded media content can be accessed for playback.

21. The system of claim 20, wherein the processor electronics are further configured to perform operations comprising:

progressively updating the second download indicator as additional media content associated with the identified playback location is downloaded.

22. The system of claim 20, wherein the processor electronics are further configured to perform operations comprising:

representing the first and second download indicators as a single download indicator associated with the status bar when the media content corresponding to the portion of the video media file between the first and second download indicators has been downloaded.

23. The system of claim 20, wherein the processor electronics are further configured to perform operations comprising:

receiving additional input from a user identifying a new playback location associated with the video media file;

downloading media content corresponding to the new playback location from the video media file; and associating a new download indicator with the status bar, the new download indicator representing an amount of downloaded media content comprising a contiguous portion of the video media file that includes the new playback location.

24. The system of claim 20, wherein the processor electronics are further configured to perform operations comprising:

progressively updating the new download indicator as additional media content is downloaded.

25. The system of claim 20, wherein:

the user input comprises a skip from an existing playback location.

26. The system of claim 20, wherein the processor electronics are further configured to perform operations comprising:

generating display information including the status bar persistently until all of the media content included in the video media file has been downloaded.

27. The system of claim 20, wherein the processor electronics are further configured to perform operations comprising:

generating display information including the status bar persistently for a predetermined duration after the user input has been received.

* * * * *